(12) United States Patent
Ishida et al.

(10) Patent No.: US 6,851,760 B2
(45) Date of Patent: Feb. 8, 2005

(54) BRAKE APPARATUS FOR A VEHICLE

(75) Inventors: Satoshi Ishida, Chiryu (JP); Masaki Oishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/147,081

(22) Filed: May 17, 2002

(65) Prior Publication Data
US 2002/0190571 A1 Dec. 19, 2002

(30) Foreign Application Priority Data

| May 18, 2001 | (JP) | .................................. 2001-149727 |
| May 18, 2001 | (JP) | .................................. 2001-149728 |

(51) Int. Cl.[7] .............................................. B60T 13/18
(52) U.S. Cl. .............................. 303/11; 303/3; 303/15; 303/115.4
(58) Field of Search ........................ 303/3, 4, 11, 12, 303/15, 20, 122.09, 122.15, 142, 155, 157, 158, 191, 199, 113.3, 114.1, 114.3, 115.3, 116.1, DIG. 1, DIG. 2, 115.1, 115.4; 188/356, 358; 60/397; 701/71, 76, 82, 83

(56) References Cited

U.S. PATENT DOCUMENTS

| 5,967,628 A | * | 10/1999 | Abe et al. ............... 303/122.12 |
| 5,984,430 A | * | 11/1999 | Koga et al. ............... 303/116.1 |
| 6,132,014 A | * | 10/2000 | Kiso et al. .................. 303/146 |
| 6,283,559 B1 | * | 9/2001 | Yamada et al. .......... 303/113.3 |
| 6,412,883 B1 | * | 7/2002 | Mizutani et al. ......... 303/114.3 |
| 6,460,944 B2 | * | 10/2002 | Isono et al. ................. 303/159 |

FOREIGN PATENT DOCUMENTS

| JP | 2000127948 A | * | 5/2000 |

* cited by examiner

Primary Examiner—Robert A. Siconolfi
Assistant Examiner—Melanie Torres
(74) Attorney, Agent, or Firm—Burns, Doane, Swecker & Mathis, L.L.P.

(57) ABSTRACT

A vehicle brake apparatus comprises brake operation detecting device for detecting an operation of a brake operating member, a fluid pressure type booster which boosts the operating force applied to the brake operating member, a pressure detecting device for detecting a pressure supplied to the fluid pressure type booster, and an electric motor control device. A recirculating type hydraulic pressure modulator is disposed in a hydraulic pressure conduit between a master cylinder and a wheel brake cylinder. The electric motor control device drives an electric motor for activating a recirculating pump in response to the brake operation detected by the brake operation detecting device and the pressure detected by the pressure detecting means so that the pressure in the wheel brake cylinder is modulated.

12 Claims, 7 Drawing Sheets

BRAKE APPARATUS FOR A VEHICLE

CROSS REFERENCE TO RELATED APPLICATIONS

This application is based on and claims priority under 35 U.S.C. §119 with respect to a Japanese Patent Application 2001-149727, filed on May 18, 2001, and a Japanese Patent Application 2001-149728, filed on May 18, 2001, the entire content of which is incorporated herein by reference.

FIELD OF THE INVENTION

This invention generally relates to a brake apparatus for a vehicle.

BACKGROUND OF THE INVENTION

One of known brake apparatus for a vehicle is provided with a master cylinder, each wheel brake cylinder respectively mounted on each vehicle wheel, and a recirculating type hydraulic pressure modulator. The master cylinder outputs to the wheel brake cylinder a hydraulic pressure corresponding to an operating force inputted to the master cylinder from a side of a brake pedal. The wheel brake cylinder applies to the vehicle wheel a brake torque corresponding to the hydraulic pressure inputted to the wheel brake cylinder. The recirculating type hydraulic pressure modulator is disposed in a hydraulic pressure conduit connecting the master cylinder and the wheel brake cylinder so as to modulate the hydraulic pressure in the wheel brake cylinder to be different from the hydraulic pressure outputted from the master cylinder.

The recirculating type hydraulic pressure modulator is one of the components of an anti-lock control device and is provided with an auxiliary reservoir, a normally open type electromagnetic switching valve (hereinafter, referred to as a normally open type valve), a normally closed type electromagnetic switching valve (hereinafter, referred to as a normally closed type valve), a recirculating pump, and an electric motor for driving the recirculating pump. The normally open type valve serves for interrupting a communication between the master cylinder and the wheel brake cylinder. The normally closed type valve serves for establishing a communication between the wheel brake cylinder and the auxiliary reservoir. The recirculating pump serves for recirculating a brake fluid accumulated in the auxiliary reservoir to a hydraulic pressure conduit between the master cylinder and the normally open type valve.

However, the above described vehicle brake apparatus may have a following problem. An insufficient sealing of the normally closed type valve may occur due to a foreign object between a valve body of the normally closed type valve and a valve seat thereof. In this case, upon an operation of the brake pedal, the brake fluid sent to the wheel brake cylinder from the master cylinder may be leaked to the auxiliary reservoir due to the insufficient sealing of the normally closed type valve. Therefore, a brake pedal stroke amount under the above described condition may be drastically increased for obtaining a desired vehicle wheel brake torque comparing with a brake pedal stroke amount under a normal sealing condition of the normally closed type valve. In other words, when the brake pedal is operated in the state where the normally closed type valve raises insufficient sealing, the desired vehicle wheel brake torque may not be obtained.

Accordingly, the above disclosed vehicle brake apparatus is still susceptible of certain improvements with respect to restraining an increase of the brake pedal stroke amount due to the insufficient sealing of the normally closed type valve of the recirculating type hydraulic pressure modulator.

Further, the other known brake apparatus is additionally provided, for example with a fluid pressure type booster. The fluid pressure type booster boosts the operating force applied to the brake pedal and inputs the boosted operating force to the master cylinder. When the fluid pressure type booster malfunctions, the brake pedal operating force is drastically increased so as to obtain the desired vehicle wheel brake torque comparing with the brake pedal operating force under the normal boosting condition of the fluid pressure type booster. Therefore, should the driver apply a normal operating force to the brake pedal when the insufficient sealing is raised by the normally closed type valve and when the fluid pressure type booster malfunctions, the brake pedal stroke amount will not be sufficiently large for obtaining the desired vehicle wheel brake torque.

Accordingly, the above disclosed vehicle brake apparatus is still susceptible of certain improvements with respect to restraining the increase of the brake pedal stroke amount relative to the normal brake pedal stroke amount when the fluid pressure type booster malfunctions and when the insufficient sealing is raised by the normally closed type valve.

SUMMARY OF THE INVENTION

A brake apparatus for a vehicle comprises a wheel brake cylinder for applying a braking torque corresponding to a hydraulic pressure inputted thereto to a vehicle wheel, a master cylinder for outputting a hydraulic pressure corresponding to an operating force inputted by a brake operating member to the wheel brake cylinder, a recirculating pump activated by an electric motor, and a recirculating type hydraulic pressure modulator. The recirculating type hydraulic pressure modulator is disposed in a hydraulic pressure conduit connecting the master cylinder and the wheel brake cylinder for modulating a pressure difference between the hydraulic pressure in the wheel brake cylinder and the hydraulic pressure outputted from the master cylinder.

The vehicle brake apparatus further comprises a brake operation detecting device for detecting an operation of the brake operating member, a pressure detecting device for detecting a pressure supplied to the recirculating type hydraulic pressure modulator, and an electric motor control device for driving the electric motor for activating the recirculating pump in response to the brake operation detected by the brake operation detecting device and the pressure detected by the pressure detecting device.

According to an aspect of the present invention, the vehicle brake apparatus further comprises a sealing function detecting device for detecting insufficient sealing of a normally closed type electromagnetic switching valve of the recirculating type hydraulic pressure modulator. In this case, the brake operation detecting device detects a stroke of the brake operating member. The pressure detecting device detects the hydraulic pressure outputted from the master cylinder. The sealing function detecting device detects the insufficient sealing of the normally closed type electromagnetic switching valve of the recirculating type hydraulic pressure modulator in response to the stroke of the brake operating member detected by the brake operation detecting device and the master cylinder output hydraulic pressure detected by the pressure detecting device. Therefore, the electric motor control device drives the electric motor for activating the recirculating pump in response to the detection of the insufficient sealing by the sealing function detecting device.

According to the other aspect of the present invention, the vehicle brake apparatus further comprises a fluid pressure type booster for boosting the operating force applied to the brake operating member and a booster malfunction detecting means for detecting the malfunction of the fluid pressure type booster. In this case, the pressure detecting device detects a pressure inputted to the fluid pressure type booster. The booster malfunction detecting device detects the malfunction of the fluid pressure type booster in response to the pressure detected by the pressure detecting device. Therefore, the electric motor control device drives the electric motor for activating the recirculating pump in response to the detection of the malfunction of the fluid pressure type booster by the booster malfunction detecting device and the detection of the brake operation by the brake operation detecting means.

Further, the fluid pressure type booster can be a vacuum type booster. In this case, the pressure detecting device detects a negative pressure inputted to the vacuum type booster. The booster malfunction detecting device detects the malfunction of the vacuum type booster in response to the negative pressure detected by the pressure detecting device.

Further, the vehicle brake apparatus can be preferably provided with a pump load condition detecting device for detecting a load condition of the recirculating pump. In this case, the electric motor control device terminates the driving of the electric motor in response to the detection of the pump non-loaded condition by the pump load condition detecting device after the initiation of driving the electric motor.

Further, the driving of the electric motor can not be resumed after terminating the driving of the electric motor in response to the detection of the pump non-loaded condition by the pump load condition detecting means.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
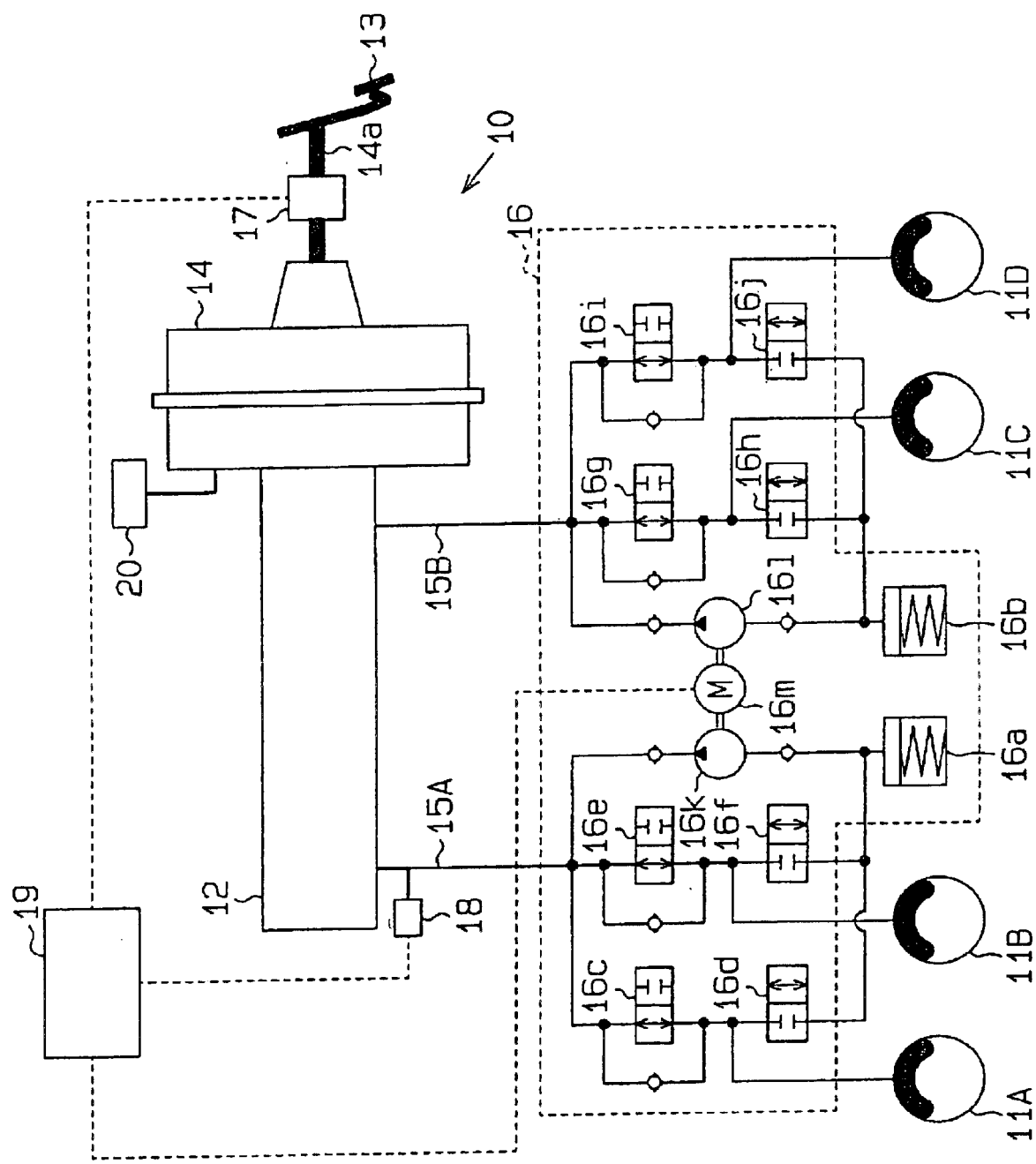
FIG. 1 is a block view illustrating an entire structure of a vehicle brake apparatus according to a first embodiment of the present invention.

Referring to FIG. 1, a vehicle brake apparatus 10 is provided with a vacuum type booster 14 (a fluid pressure type booster), a master cylinder 12, wheel brake cylinders 11A, 11B, 11C, 11D respectively mounted on a front left vehicle wheel, a front right vehicle wheel, a rear left vehicle wheel, and a rear right vehicle wheel, a recirculating type hydraulic pressure modulator 16, and an electronic control device 19.

The vacuum type booster 14 boosts an operating force applied to a brake pedal 13 (a brake operating member) and inputs the boosted operating force to the master cylinder 12. The master cylinder 12 outputs to each wheel brake cylinder 11A, 11B, 11C, 11D a hydraulic pressure corresponding to the operating force inputted from a side of the brake pedal 13. Each wheel brake cylinder 11A, 11B, 11C, 11D applies to each corresponding vehicle wheel a brake torque corresponding to the hydraulic pressure inputted thereto. The recirculating type hydraulic pressure modulator 16 is disposed in hydraulic pressure conduits 15A, 15B, both connecting the master cylinder 12 and the wheel brake cylinders 11A, 11B, 11C, 11D, respectively. The electronic control device 19 drives an electric motor 16m which is one of the components of the recirculating type hydraulic pressure modulator 16.

The master cylinder 12 forms a known structure including a front piston and a rear piston so as to define a front pressure chamber and a rear pressure chamber therein. Pressure level in each front and rear pressure chamber is increased in response to a forward movement of the front and rear pistons by the vacuum type booster 14. The front pressure chamber is connected to the hydraulic pressure conduit 15A and the rear pressure chamber is connected to the hydraulic pressure conduit 15B.

The vacuum type booster 14 forms a known structure including a constant pressure chamber at a front side of a power piston disposed in the booster 14 and a variable pressure chamber at a rear side thereof. The constant pressure chamber is always supplied with negative pressure from a negative pressure source 20 such as an intake manifold of an engine. The vacuum type booster 14 is further provided with a valve mechanism selectively switched among three positions in response to a relative displacement between the power piston and an input rod 14a connected to the brake pedal 13. The three positions are defined as follow; (1) an output decreasing position for interrupting a communication between the variable pressure chamber and an atmosphere and for establishing a communication between the variable pressure chamber and the constant pressure chamber, (2) an output maintaining position for interrupting communication of the variable pressure chamber with the atmosphere and the constant pressure chamber, and (3) an output increasing position for interrupting the communication between the variable pressure chamber and the constant pressure chamber and for establishing the communication between the variable pressure chamber and the atmosphere. The forward moving force applied to the power piston and the forward moving force applied to the input rod 14a, i.e. the operating force applied to the brake pedal 3, are operatively outputted to the master cylinder 12 via an output rod in response to a pressure difference between the constant pressure chamber and the variable pressure chamber. A reaction force corresponding to the output force is operatively applied to the input rod 14a.

The recirculating type hydraulic pressure modulator 16 as well known serves for modulating the hydraulic pressure in each wheel, brake cylinder 11A, 11B, 11C, 11D to be different from the hydraulic pressure outputted from the master cylinder 12. Therefore, the modulator 16 is one of the components of an anti-lock control device.

The recirculating type hydraulic pressure modulator 16 forms a known structure including auxiliary reservoirs 16a, 16b, a normally open type electromagnetic switching valve 16c (hereinafter, referred to as a normally open type valve) for interrupting a communication between the wheel brake cylinder 11A and the front pressure chamber of the master cylinder 12, a normally closed type electromagnetic switching valve 16d (hereinafter, referred to as a normally closed type valve) for establishing a communication between the wheel brake cylinder 11A and the auxiliary reservoir 16a, a normally open type electromagnetic switching valve 16e (hereinafter, referred to as a normally open type valve) for interrupting a communication between the wheel brake cylinder 11B and the front pressure chamber of the master cylinder 12, and a normally closed type electromagnetic switching valve 16f (hereinafter, referred to as a normally closed type valve) for establishing a communication between the wheel brake cylinder 11B and the auxiliary reservoir 16a, a normally open type electromagnetic switching valve 16g (hereinafter, referred to as a normally open type valve) for interrupting a communication between the wheel brake cylinder 11C and a rear pressure chamber of the master cylinder 12, a normally closed type electromagnetic switching valve 16h (hereinafter, referred to as a normally closed type valve) for establishing a communication between the wheel brake cylinder 11C and the auxiliary reservoir 16b, a normally open type electromagnetic switching valve 16i (hereinafter, referred to as a normally open type valve) for interrupting a communication between the wheel brake cylinder 11D and the rear pressure chamber of the master cylinder 12, a normally closed type electromagnetic switching valve 16j (hereinafter, referred to as a normally closed type valve) for establishing a communication between the wheel brake cylinder 11D and the auxiliary reservoir 16b, a recirculating pump 16k for recirculating the brake fluid in the auxiliary reservoir 16a to the hydraulic pressure conduit 15A between the normally open type valves 16c, 16e and the master cylinder 12, a recirculating pump 16l for recirculating the brake fluid in the auxiliary reservoir 16b to the hydraulic pressure conduit 15B between the normally open type valves 16g, 16i and the master cylinder 12, and the electric motor 16m for driving the recirculating pumps 16k, 16l.

The valves 16c, 16d are activated for modulating the hydraulic pressure in the wheel brake cylinder 11A. The valves 16e, 16f are activated for modulating the hydraulic pressure in the wheel brake cylinder 11B. The valves 16g, 16h are activated for modulating the hydraulic pressure in the wheel brake cylinder 11C. The valves 16i, 16j are activated for modulating the hydraulic pressure in the wheel brake cylinder 11D. Assuming that the hydraulic pressure in the wheel brake cylinder 11A is decreased, the normally open type valve 16c is switched to the closed position and the normally closed type valve 16d is switched to the open position. Therefore, the brake fluid is drained from the wheel brake cylinder 11A to the auxiliary reservoir 16a, wherein the hydraulic pressure in the wheel brake cylinder 11A is decreased. When the hydraulic pressure in the wheel brake cylinder 11A is again increased after being decreased, the normally closed type valve 16d is returned to the closed position and the normally open type valve 16c is returned to the open position. Therefore, the brake fluid is supplied to the wheel brake cylinder 11A via the normally open type valve 16c, wherein the hydraulic pressure in the wheel brake cylinder 11A is increased.

As described above, when the hydraulic pressure in each wheel brake cylinder 11A, 11B, 11C, 11D is modulated by activating the valves 16c through 16j, the recirculating pumps 16k, 16l are activated by the driven electric motor 16m. The brake fluid drained to the auxiliary reservoir 16a, 16b is hence sequentially recirculated to the hydraulic pressure conduits 15A, 15B between the master cylinder 12 and the normally open type valves 16c, 16e, 16g, 16i. Therefore, the increase of the stroke amount of the brake pedal 13 can be restrained.

Figure 3:
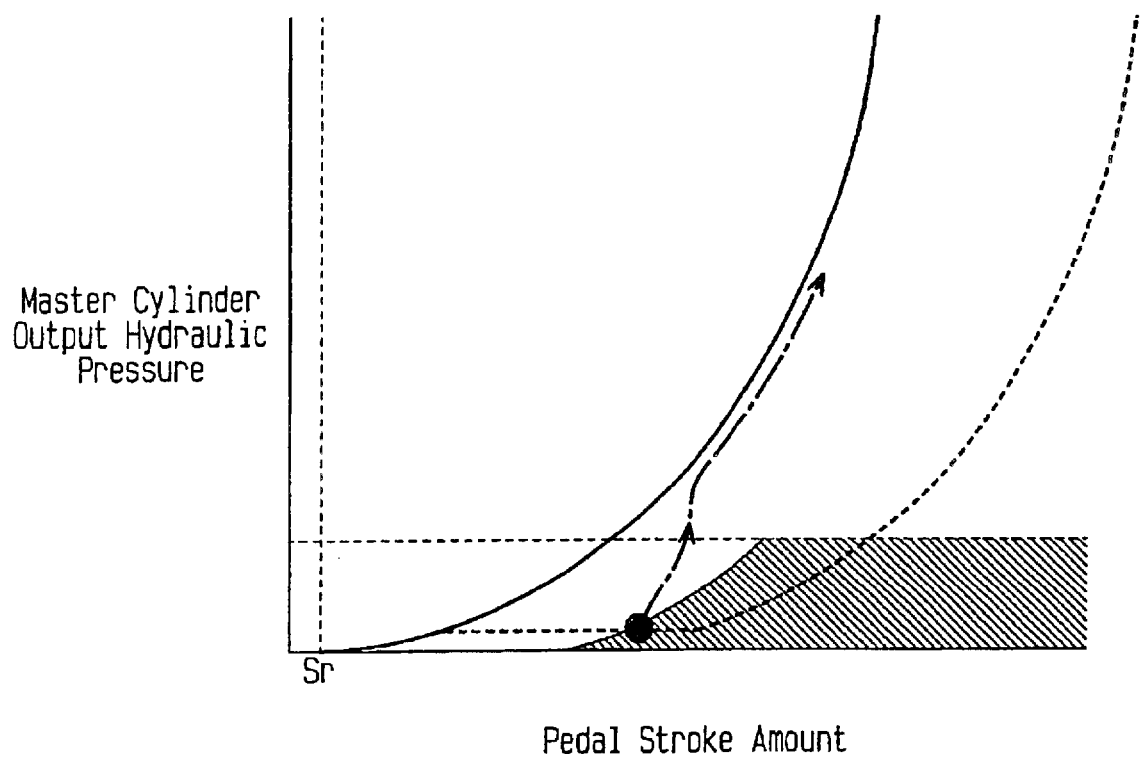
FIG. 3 is a graph illustrating a relationship between a brake pedal stroke amount and a master cylinder output hydraulic pressure according to the first embodiment of the present invention.

Upon the operation of the brake pedal 13 under the state where at least any one of the normally closed type valves 16d, 16f, 16h, 16j, for example the normally closed type valve 16d raises insufficient sealing, the brake fluid sent to the wheel brake cylinders 11A, 11B from the master cylinder 12 may be leaked to the auxiliary reservoir 16a. Therefore, the brake pedal stroke amount under the above described condition is drastically increased for obtaining the desired braking force comparing with the normal brake pedal stroke amount without insufficient sealing of the normally closed type valve 16d. Referring to FIG. 3, a solid line represents a relationship between the brake pedal stroke amount and the master cylinder output hydraulic pressure under the state where insufficient sealing is not raised by any one of the valves 16d, 16f, 16h, 16j. On the other hand, a dot line in FIG. 3 represents a relationship between the brake pedal stroke amount and the master cylinder output hydraulic pressure under the state where any one of the valves 16d, 16f, 16h, 16j, for example the valve 16d raises insufficient sealing. Therefore, when the brake pedal 13 is operated under the state where at least any one of the normally closed type valves 16d, 16f, 16h, 16j raises insufficient sealing, the stroke amount of the brake pedal 13 will not be sufficiently large for obtaining the desired braking force.

To overcome the above described problem, the vehicle brake apparatus according to a first embodiment of the present invention is further provided with a stroke sensor 17 (brake operation detecting means) for detecting the stroke amount of the brake pedal 13 and a pressure sensor 18 (pressure detecting means) for detecting the hydraulic pressure outputted from the master cylinder 12. The insufficient sealing of any one of the normally closed type valves 16d, 16f, 16h, 16j can be detected by the electronic control device 19 (sealing function detecting means) based upon each output detected by the stroke sensor 17 and the pressure sensor 18. The electronic control device 19 (electric motor control means) serves for driving the electric motor 16m of the recirculating type hydraulic pressure modulator 16 in response to the detection of insufficient sealing.

Figure 2:
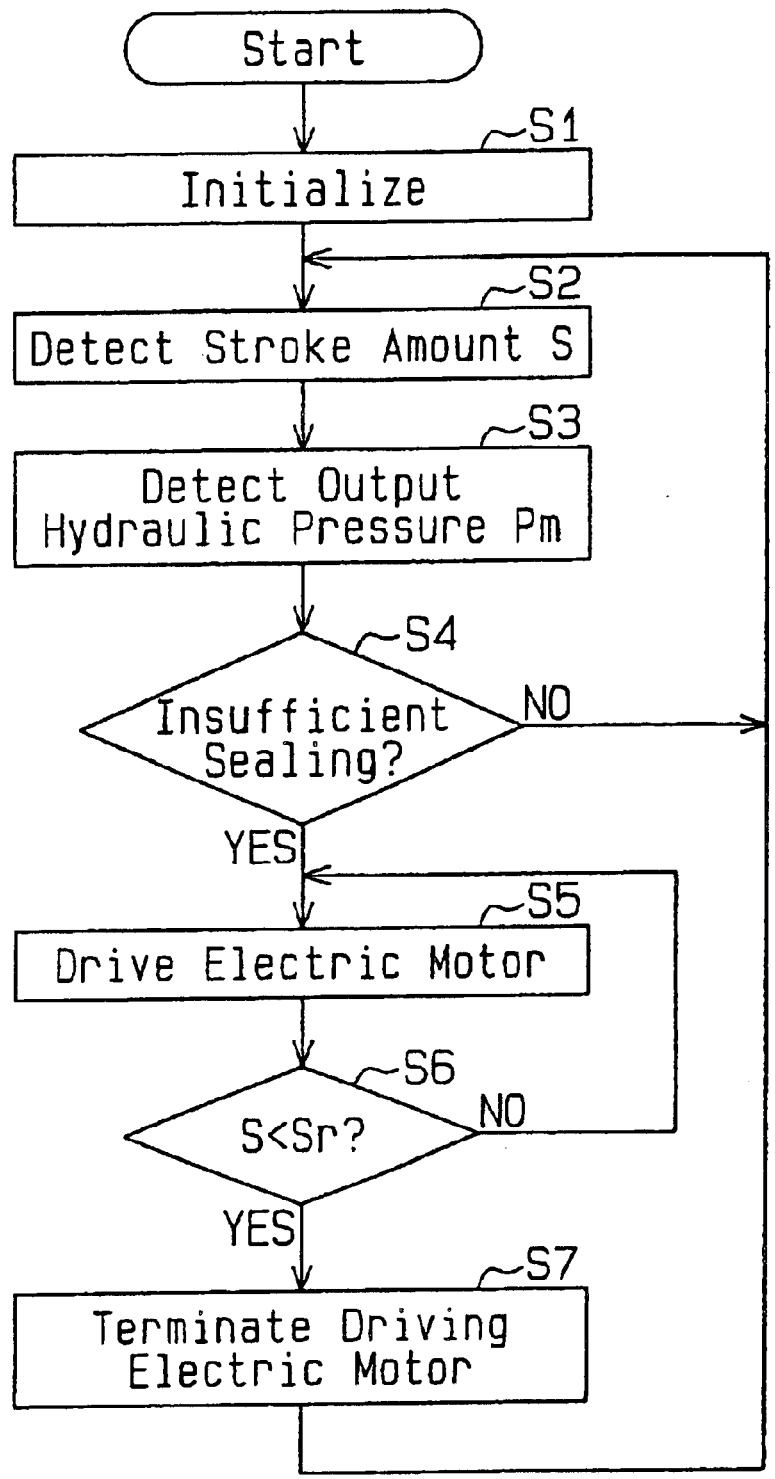
FIG. 2 is a flow chart describing an operation of an electronic control device according to the first embodiment of the present invention.

The electronic control device 19 including a microcomputer performs a program in response to a flow chart illustrated in FIG. 2 at a predetermined period of time upon an ON-operation of a vehicle ignition switch. Referring to FIG. 2, the electronic control device 19 primarily initializes data at step S1. At step S2, a brake pedal stroke amount S is detected by the stroke sensor 17. At step S3, a master cylinder output hydraulic pressure Pm is detected by the pressure sensor 18. The program further proceeds to step S4 so as to judge whether or not insufficient sealing has been raised by at least any one of the normally closed type valves 16d, 16f, 16h, 16j based upon the brake pedal stroke amount S and the master cylinder output hydraulic pressure Pm. More particularly, the relationship between the brake pedal stroke amount S and the master cylinder output hydraulic pressure Pm is judged whether or not to be within a predetermined shaded range in FIG. 3. When the relationship is within the predetermined shaded range, the microcomputer judges that insufficient sealing has been raised by at least any one of the normally closed type valves so that the program proceeds to step S5. At step S5, the electronic control device 19 drives the electric motor 16m. The program then proceeds to step S6. On the other hand, when the relationship is beyond the predetermined shaded range, the microcomputer judges that insufficient sealing has not been raised by any one of the normally closed type valves so that the program returns to step S2. As illustrated in FIG. 3, at step S6, the microcomputer judges whether or not the brake pedal stroke amount S is less than a predetermined threshold value Sr. That is, the microcomputer judges whether or not the brake pedal 13 was released from being operated. When the brake pedal stroke amount S is less than the predetermined threshold value Sr, the program proceeds to step S7 so as to terminate the driving of the electric motor 16m. The program then returns to step S2. On the other hand, when the brake pedal stroke amount S is not less than the predetermined threshold value Sr, the program returns to step S5.

As described above, the insufficient sealing of at least any one of the normally closed type valves 16d, 16f, 16h, 16j can be detected based upon the brake pedal stroke amount S and the master cylinder output hydraulic pressure Pm. The recirculating pumps 16k, 16l are activated by the electric motor 16m in response to the detection of the insufficient sealing. Therefore, the brake fluid leaked to the auxiliary reservoirs 16a, 16b can be recirculated to the hydraulic pressure conduits 15A, 15B between the master cylinder 12 and the normally open type valves 16c, 16e, 16g, 16i, respectively. Therefore, the increase of the brake pedal stroke amount can be effectively restrained and the desired vehicle wheel braking torque can be effectively obtained. A dashed line illustrated in FIG. 3 represents the relationship between the mater cylinder output hydraulic pressure and the brake pedal stroke amount under the state where the electric motor 16m has been driven in response to the detection of the insufficient sealing.

According to the first embodiment of the present invention, the driving of the electric motor 16m is terminated in response to the detection of the released brake pedal 13 based upon the brake pedal stroke amount S. However, the stroke sensor 17 can be substituted by a brake switch. The brake switch can be turned ON and OFF in response to the operation and the releasing of the brake pedal 13. Therefore, the driving of the electric motor 16m can be terminated by detecting the released brake pedal 13 based upon the signal outputted from the brake switch.

Figure 4:
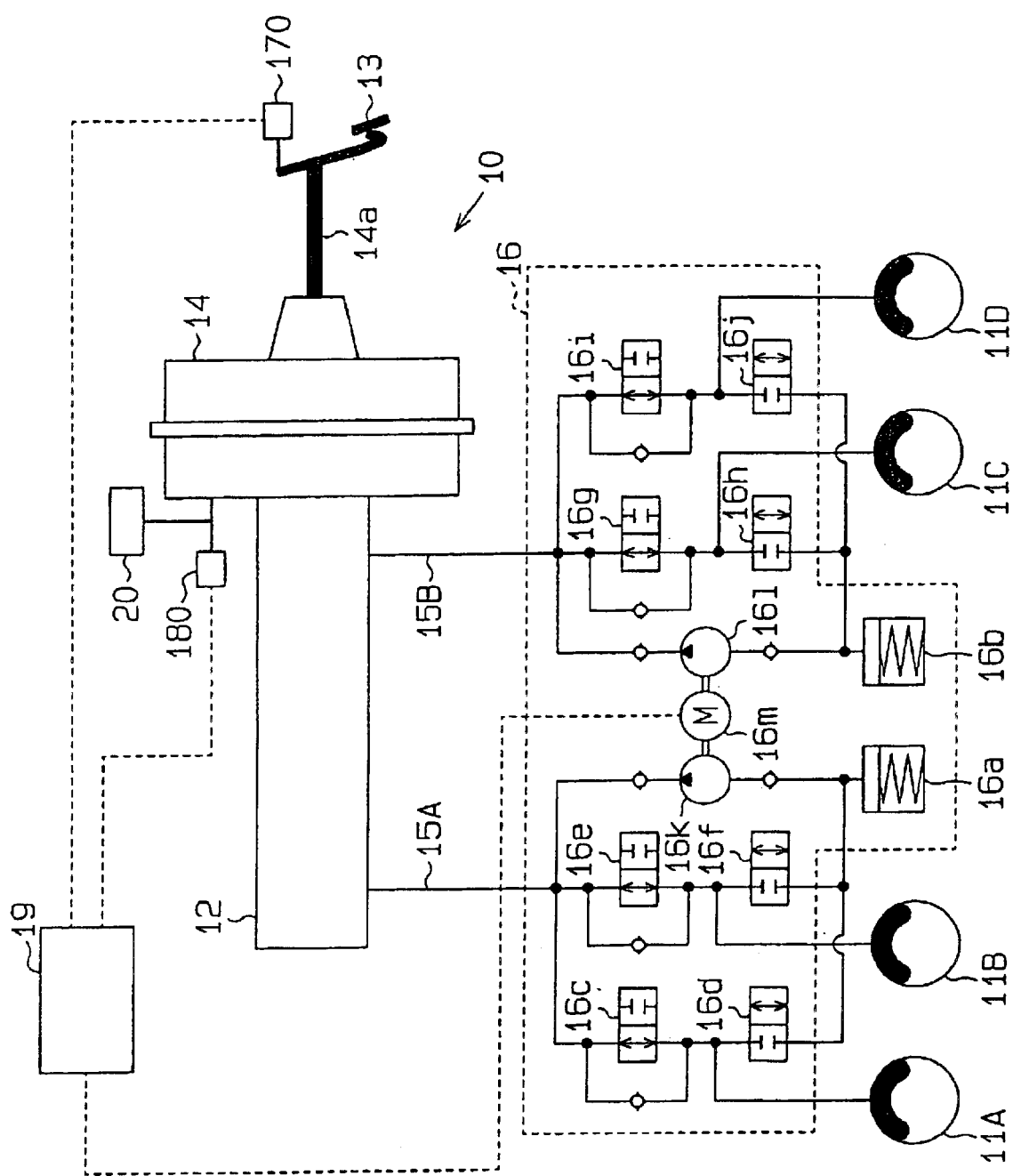
FIG. 4 is a block view illustrating an entire structure of the vehicle brake apparatus according to second, third, fourth embodiments of the present invention.

Further, assuming the brake pedal 13 is operated when the vacuum type booster 14 malfunctions under the state where insufficient sealing has been raised by at least any one of the normally closed type valves, the brake pedal 13 can not be operated sufficiently enough for obtaining the desired braking force. Therefore, the desired braking force may not be effectively obtained. To overcome this problem, as illustrated in FIG. 4, the vehicle brake apparatus according to a second embodiment of the present invention is further provided with a pressure sensor 180 (booster malfunction detecting means) for detecting a pressure P outputted to the constant pressure chamber of the vacuum type booster 14 from the negative pressure source 20 and a brake switch 170 (brake operation detecting means) switched from OFF to ON in response to the operation of the brake pedal 13. The electronic control device 19 (booster malfunction detecting means and -electric motor control means) serves for driving the electric motor 16m based upon each signal outputted from the pressure sensor 180 and the brake switch 170.

Figure 5:
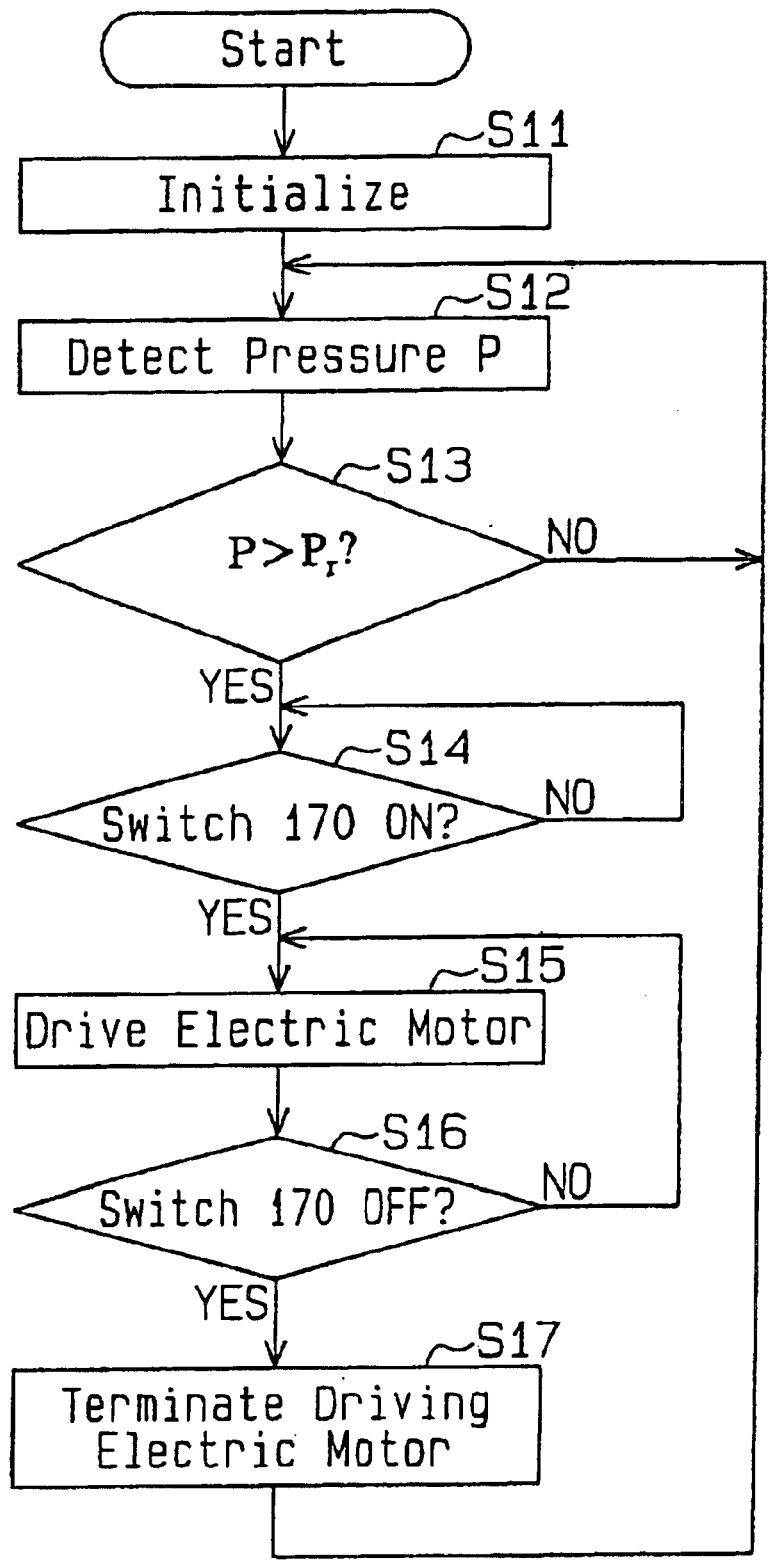
FIG. 5 is a flow chart describing the operation of the electronic control device according to the second embodiment of the present invention.

The electronic control device 19 including the microcomputer performs a program in response to a flow chart illustrated in FIG. 5 at a predetermined period of time upon an ON-operation of the vehicle ignition switch. Referring to FIG. 5, the electronic control device 19 primarily initializes data at step S11. At step S12, the pressure sensor 180 detects the pressure P outputted to the constant pressure chamber of the booster 14 from the negative pressure source 20. At step S13, the microcomputer judges whether or not the vacuum type booster 14 malfunctions by comparing the detected pressure P with a predetermined threshold value Pr. The predetermined threshold value Pr is an upper threshold value of the pressure level of the constant pressure chamber of the booster 14 for performing the boosting function. When the detected pressure P is greater than the threshold value Pr, the microcomputer judges that the booster 14 malfunction so that the program proceeds to step S14. On the other hand, when the detected pressure P is not greater than the threshold value Pr, the microcomputer judges that the booster 14 normally functions so that the program returns to step S12.

At step S14, the microcomputer judges whether or not the brake switch 170 is ON. When the brake switch 170 is not ON, i.e. when the brake pedal 13 is not operated, the program at step S14 is repeatedly performed. However, when the brake switch 170 is ON, i.e. when the brake pedal 13 is operated, the program proceeds to step S15 so as to drive the electric motor 16m. The program then proceeds to step S16 for judging whether or not the brake switch 170 is OFF. When the brake switch 170 is OFF, i.e. when the brake pedal 13 is not operated, the program proceeds to step S17 so as to terminate the driving of the electric motor 16m. The program then returns to step S12. On the other hand, when the brake switch 170 is not OFF, i.e. when the brake pedal 13 is operated, the program returns to step S15.

As described above, when the brake pedal 13 is operated under the state where the vacuum type booster 14 malfunctions, the recirculating pumps 16k, 16l are activated. Therefore, should the brake fluid sent to each wheel brake cylinder 11A through 11D from the master cylinder 12 be leaked to the auxiliary reservoir 16a, 16b due to insufficient sealing of any one of the normally closed type valves 16d, 16f, 16h, 16j, the brake fluid in the auxiliary reservoir 16a, 16b can be recirculated to the hydraulic pressure conduits 15A, 15B between the master cylinder 12 and the normally open type valves 16c, 16e, 16g, 16i, respectively. Therefore, the increase of the brake pedal stroke amount can be restrained and the desired braking force can be obtained.

Figure 6:
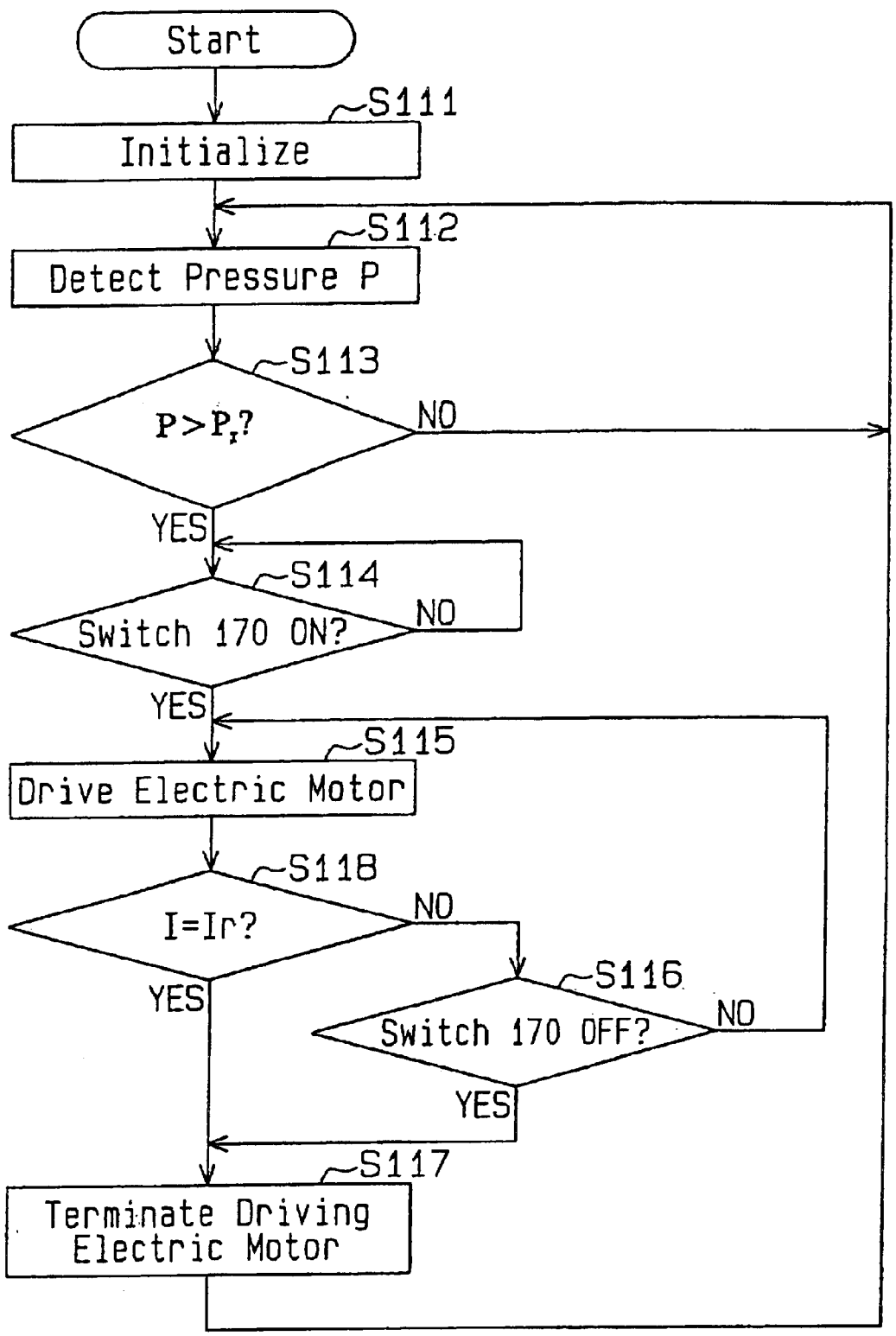
FIG. 6 is a flow chart describing the operation of the electronic control device according to the third embodiment of the present invention.

According to a third embodiment of the present invention, the electronic control device 19 can be operated following a flow chart illustrated in FIG. 6. In this case, the electronic control device 19 is further provided with an electric current sensor for detecting an electric current value I of the electric motor 16m. An only difference of the flow chart illustrated in FIG. 3 relative to the flow chart illustrated in FIG. 2 is that the microcomputer judges whether or not the electric current value I of the electric motor 16m is substantially equal to a non-loaded electric current value Ir at step S118 between step S115 and step S116. Step S115 corresponds to step S15 in FIG. 5 and step S116 corresponds to step S16 in FIG. 5. When the electric current value I is not substantially equal to the non-loaded electric current value Ir, the program proceeds to step S116. On the other hand, when the electric current value I is substantially equal to the non-loaded electric current value Ir, the program proceeds to step S117 so as to terminate the driving of the electric motor 16m. More particularly, the electric current value I of the electric motor 16m corresponds to the load applied to the recirculating pumps 16k, 16l. That is, the detection of the electric current value I corresponds to the detection of the load applied to the recirculating pumps 16k, 16l. Therefore, when the electric current value I is substantially equal to the non-loaded electric current value Ir, no load is applied to the recirculating pumps 16k, 16l. In the other words, no brake fluid is accumulated in the auxiliary reservoirs 16a, 16b. In this case, no insufficient sealing is assumed to have bee raised by any one of the normally closed type valves 16d, 16f, 16h, 16j. Steps 111 through 114 correspond to steps S11 through 14 in FIG. 5.

As described above, the electric motor 16m is driven in response to the detection of the malfunction of the vacuum type booster 14 and the detection of the operated brake pedal 13. However, the driving of the electric motor 16m is terminated when insufficient sealing is not raised by any one of the normally closed type valves. Therefore, excessive driving of the electric motor 16m and the recirculating pumps 16k, 16l can be restrained. In this case, the electronic control device 19 serves as pump load condition detecting means.

Figure 7:
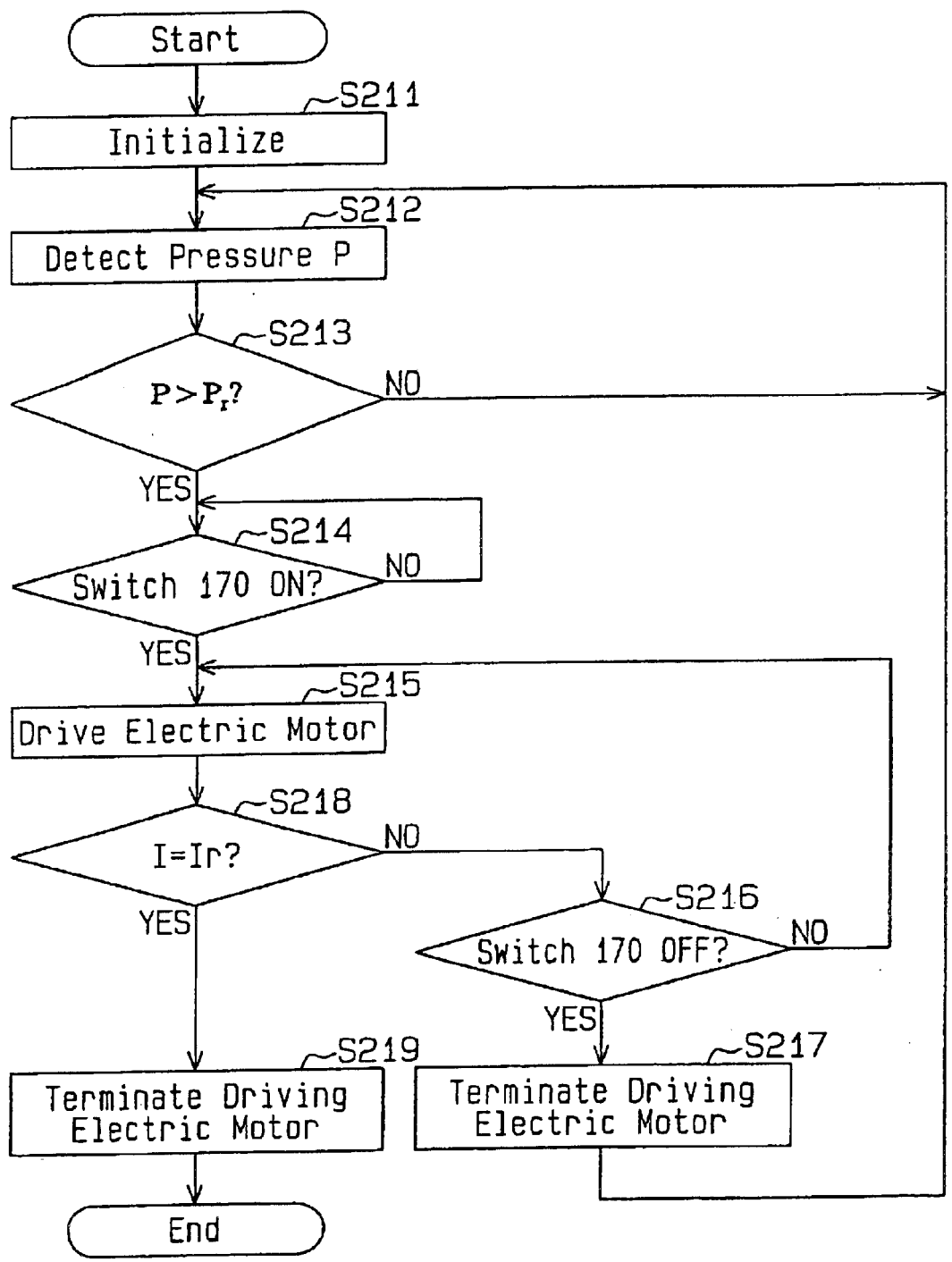
FIG. 7 is a flow chart describing the operation of the electronic control device according to the fourth embodiment of the present invention.

According to a fourth embodiment of the present invention, the electronic control device 19 can be operated following a flow chart illustrated in FIG. 7. In this case, the electronic control device 19 is provided with the electric current sensor for detecting the electric current value I of the electric motor 16m in the same manner as the third embodiment. An only difference of the flow chart illustrated in FIG. 7 relative to the flow chart illustrated in FIG. 6 is that the program proceeds to step S219 when the microcomputer judges at step S218 (corresponding to step S118 in FIG. 6) that the electric current value I is substantially equal to the non-loaded electric current value Ir. The driving of the electric motor 16m is terminated at step S219 and the program is not required to return to step S212 corresponding to step S112 in FIG. 6. Therefore, excessive driving of the electric motor 16m and the recirculating pumps 16k, 16l is reduced to only one time. Steps 211 through 217 correspond to steps 111 through 117 in FIG. 6.

According to the first, second, third, and fourth embodiments of the present invention, the vehicle brake apparatus 10 employs the vacuum type booster 14. However, the vacuum type booster 14 can be substituted by a hydraulic pressure type booster for performing boosting function with power hydraulic pressure inputted from a power hydraulic pressure source. In this case, the power hydraulic pressure outputted from the power hydraulic pressure source to the hydraulic pressure type booster is detected by a pressure sensor. Therefore, the hydraulic pressure type booster can be detected whether or not to be malfunction by comparing the detected power hydraulic pressure with a predetermined threshold pressure value. The predetermined threshold pressure value is a lower threshold value of the power hydraulic pressure of the fluid pressure type booster for performing the boosting function. When the detected power hydraulic pressure is substantially equal to or less than the predetermined threshold pressure value, the microcomputer judges that the hydraulic pressure type booster malfunctions.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A method for driving an electric motor of a recirculating type hydraulic pressure modulator disposed in a hydraulic pressure conduit connecting a master cylinder and a wheel cylinder for modulating a pressure difference between a hydraulic pressure in the wheel cylinder and a hydraulic pressure outputted from the master cylinder, the recirculating type hydraulic pressure modulator comprising an auxiliary reservoir, a normally open type valve disposed between the master cylinder and the wheel cylinder, a normally closed type valve disposed between the wheel cylinder and the auxiliary reservoir, and a hydraulic pump driven by the electric motor for recirculating hydraulic fluid discharged from the wheel cylinder through the normally closed valve and stored within the auxiliary reservoir to the hydraulic pressure conduit, the method comprising:

detecting a pressure inputted to a vacuum type booster from a negative pressure source;

comparing the detected pressure with a predetermined threshold pressure value;

judging whether or not a brake pedal is under operation;

driving the electric motor so that when the detected pressure is greater than the predetermined threshold pressure value and when the brake pedal is under operation the hydraulic pump recirculates to the hydraulic pressure conduit only hydraulic fluid within the auxiliary reservoir that has come from the wheel cylinder through the normally closed type valve;

judging whether or not the brake pedal is released; and terminating the driving of the electric motor when the brake pedal is released.

2. A method for driving an electric motor according to claim 1, further comprising:

detecting an electric current value of the electric motor of a recirculating type hydraulic pressure modulator comparing the detected electric current value of the electric motor with a non-loaded electric current value, wherein the driving of the electric motor is terminated when the electric current value of the electric motor is substantially equal to the non-loaded electric current value.

3. A method for driving an electric motor according to claim 2, wherein the driving of the electric motor is not resumed after terminating the driving of the electric motor in response to the detection of the pump non-loaded condition by the pump load condition detecting means.

4. A brake apparatus for a vehicle comprising;

a master cylinder for outputting a hydraulic pressure corresponding to an operation force inputted by a brake operating member;

a wheel cylinder to which is inputted the hydraulic pressure for applying a braking torque to a vehicle wheel corresponding to the hydraulic pressure;

vacuum type booster for operating the master cylinder;

a recirculating type hydraulic pressure modulator connected to a hydraulic pressure conduit extending from the master cylinder and comprising an electric motor, an auxiliary reservoir, a normally open type valve disposed between the master cylinder and the wheel cylinder, a normally closed type valve disposed between the wheel cylinder and the auxiliary reservoir, and a hydraulic pump driven by the electric motor for recirculating hydraulic fluid discharged from the wheel cylinder through the normally closed valve and stored within the auxiliary reservoir to the hydraulic pressure conduit;

brake operation detecting means for detecting an operation of the brake operating member;

booster malfunction detecting means for detecting a booster malfunction of the vacuum booster; and electric motor control means for driving the electric motor so that in response to detection of operation of the brake operating member by the brake operation detecting means and detection of the booster malfunction by the booster malfunction detecting means the hydraulic pump recirculates to the hydraulic pressure conduit only hydraulic fluid within the auxiliary reservoir that has come from the wheel cylinder through the normally closed type valve.

5. A brake apparatus according to claim 4, further comprising: a pump load condition detecting means for detecting a load condition of the recirculating pump, wherein the electric motor control means terminates the driving of the electric motor in response to the detection of the pump non-loaded condition by the pump load condition detecting means after the initiation of driving the electric motor.

6. A brake apparatus according to claim 5, wherein the driving of the electric motor is not resumed after terminating the driving of the electric motor in response to the detection of the pump non-loaded condition by the pump load condition detecting means.

7. A method for driving an electric motor of a recirculating type hydraulic pressure modulator disposed in a hydraulic pressure conduit connecting a master cylinder and a wheel cylinder for modulating a pressure difference between a hydraulic pressure in the wheel cylinder and a hydraulic pressure outputted from the master cylinder, the recirculating type hydraulic pressure modulator comprising an auxiliary reservoir, a normally open type valve disposed between the master cylinder and the wheel cylinder, a normally closed type valve disposed between the wheel cylinder and the auxiliary reservoir, and a hydraulic pump driven by the electric motor for recirculating hydraulic fluid stored within the auxiliary reservoir to the hydraulic pressure conduit, the method comprising:

detecting a pressure inputted to a vacuum type booster from a negative pressure source;

comparing the detected pressure with a predetermined threshold pressure value;

judging whether or not a brake pedal is under operation;

driving the electric motor so that when the detected pressure is greater than the predetermined threshold pressure value and when the brake pedal is under operation the hydraulic pump recirculates to the hydraulic pressure conduit only hydraulic fluid within the auxiliary reservoir;

judging whether the brake pedal is released; and terminating the driving of the electric motor when the brake pedal is released.

8. A method for driving an electric motor according to claim 7, further comprising:

detecting an electric current value of the electric motor of a recirculating type hydraulic pressure modulator comparing the detected electric current value of the electric motor with a non-loaded electric current value, wherein the driving of the electric motor is terminated when the electric current value of the electric motor is substantially equal to the non-loaded electric current value.

9. A method for driving an electric motor according to claim 8, wherein the driving of the electric motor is not resumed after terminating the driving of the electric motor in response to the detection of the pump non-loaded condition by the pump load condition detecting means.

10. A brake apparatus for a vehicle comprising;

a master cylinder for outputting a hydraulic pressure corresponding to an operation force inputted by a brake operating member;

a wheel cylinder to which is inputted the hydraulic pressure for applying a braking torque to a vehicle wheel corresponding to the hydraulic pressure;

vacuum type booster for operating the master cylinder;

a recirculating type hydraulic pressure modulator connected to a hydraulic pressure conduit extending from the master cylinder and comprising an electric motor, an auxiliary reservoir, a normally open type valve disposed between the master cylinder and the wheel cylinder, a normally closed type valve disposed between the wheel cylinder and the auxiliary reservoir, and a hydraulic pump driven by the electric motor for recirculating hydraulic fluid stored within the auxiliary reservoir to the hydraulic pressure conduit;

brake operation detecting means for detecting an operation of the brake operating member;

booster malfunction detecting means for detecting a booster malfunction of the vacuum booster; and electric motor control means for driving the electric motor so that in response to detection of operation of the brake operating member by the brake operation detecting means and detection of the booster malfunction by the booster malfunction detecting means the hydraulic pump recirculates to the hydraulic pressure conduit only hydraulic fluid within the auxiliary reservoir.

11. A brake apparatus according to claim 10, further comprising: a pump load condition detecting means for detecting a load condition of the recirculating pump, wherein the electric motor control means terminates the driving of the electric motor in response to the detection of the pump non-loaded condition by the pump load condition detecting means after the initiation of driving the electric motor.

12. A brake apparatus according to claim 11, wherein the driving of the electric motor is not resumed after terminating the driving of the electric motor in response to the detection of the pump non-loaded condition by the pump load condition detecting means.

* * * * *